US007884864B2

(12) United States Patent
Hamamoto

(10) Patent No.: US 7,884,864 B2
(45) Date of Patent: Feb. 8, 2011

(54) NOISE REDUCTION DEVICE, NOISE REDUCTION METHOD AND IMAGE CAPTURING DEVICE

(75) Inventor: Yasuhachi Hamamoto, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 1497 days.

(21) Appl. No.: 11/091,335

(22) Filed: Mar. 29, 2005

(65) Prior Publication Data

US 2005/0270388 A1 Dec. 8, 2005

(30) Foreign Application Priority Data

Mar. 29, 2004 (JP) ............................. P2004-094594
Sep. 30, 2004 (JP) ............................. P2004-289324

(51) Int. Cl.
*H04N 5/217* (2006.01)
(52) U.S. Cl. ........................ 348/241; 382/162; 382/275
(58) Field of Classification Search ........................ None
See application file for complete search history.

(56) References Cited

U.S. PATENT DOCUMENTS

| 5,561,724 | A | 10/1996 | Kido et al. | |
| 6,229,578 | B1 * | 5/2001 | Acharya et al. | ............. 348/607 |
| 6,757,014 | B1 | 6/2004 | Kasahara | |

(Continued)

FOREIGN PATENT DOCUMENTS

JP 61-261974 11/1986

(Continued)

OTHER PUBLICATIONS

Japanese Office Action, with English translation, issued in Japanese Patent Application No. 2004-289324, mailed Sep. 29, 2009.

*Primary Examiner*—Lin Ye
*Assistant Examiner*—Dennis Hogue
(74) *Attorney, Agent, or Firm*—McDermott Will & Emery LLP

(57) ABSTRACT

A noise reduction device comprises a first signal reading-out unit for reading out a video signal of a target pixel for which a noise reduction is performed; a second signal reading-out unit for reading out video signals of external peripheral pixels arranged around internal peripheral pixels arranged at positions closest to the target pixel, the external peripheral pixels being arranged at positions closest to the target pixel in radial directions from the target pixel and outputting the same color signals as the video signal of the target pixel; a selection controller for judging presence of a correlation between the video signal of the target pixel and a video signal of each of the external peripheral pixel based on a relation between a signal value of the video signal of the target pixel and a signal value of the video signal of each of the external peripheral pixels; a signal calculator for calculating the signal value of the video signal of the target pixel by use of the signal values of the video signals of the external peripheral pixels; and a selector for selecting the signal value of the video signal of the target pixel determined by the signal calculator when it is judged by the selection controller that the number of the video signals of the external peripheral pixels having correlations with the video signal of the target pixel is large.

16 Claims, 6 Drawing Sheets

U.S. PATENT DOCUMENTS

| | | | | |
|---|---|---|---|---|
| 6,907,144 | B1* | 6/2005 | Gindele | 382/275 |
| 2003/0012452 | A1* | 1/2003 | Trifonov et al. | 382/275 |
| 2003/0043286 | A1* | 3/2003 | Kato | 348/246 |
| 2003/0048368 | A1 | 3/2003 | Bosco et al. | |
| 2003/0222995 | A1* | 12/2003 | Kaplinsky et al. | 348/247 |
| 2004/0001621 | A1* | 1/2004 | Kusakabe et al. | 382/164 |
| 2004/0008902 | A1 | 1/2004 | Nakajima et al. | |
| 2004/0119861 | A1* | 6/2004 | Bosco et al. | 348/272 |
| 2005/0010621 | A1* | 1/2005 | Pinto et al. | 708/200 |
| 2008/0259190 | A1 | 10/2008 | Bosco et al. | |

FOREIGN PATENT DOCUMENTS

| | | |
|---|---|---|
| JP | 06-086104 | 3/1994 |
| JP | 06-348842 | 12/1994 |
| JP | 09-083804 | 3/1997 |
| JP | 2000-023173 | 1/2000 |
| JP | 2001-005958 | 1/2001 |
| JP | 2001-054125 | 2/2001 |
| JP | 2002-259962 | 9/2002 |
| JP | 2002-281316 | 9/2002 |
| JP | 2003-153290 | 5/2003 |
| JP | 2003-179779 | 6/2003 |

* cited by examiner

| G | R | G | R | G | R | G | R |
|---|---|---|---|---|---|---|---|
| B | G | B | G | B | G | B | G |
| G | R | G | R | G | R | G | R |
| B | G | B | G | B | G | B | G |
| G | R | G | R | G | R | G | R |
| B | G | B | G | B | G | B | G |

FIG.4
| G00 | G01 | G02 | G03 | G04 |
|-----|-----|-----|-----|-----|
| G10 | G11 | G12 | G13 | G14 |
| G20 | G21 | G22 | G23 | G24 |
| G30 | G31 | G32 | G33 | G34 |
| G40 | G41 | G42 | G43 | G44 |
FIG.5A
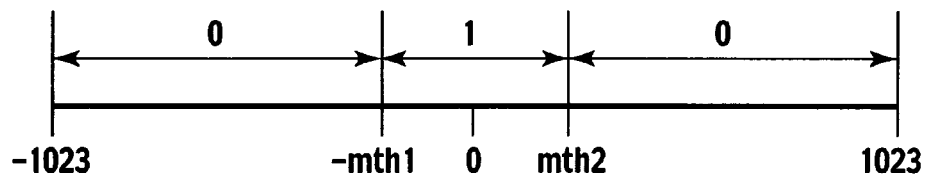
FIG.5B
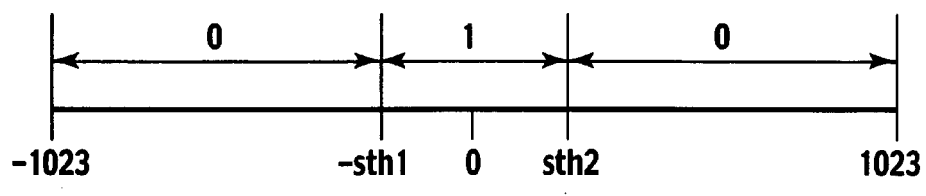
FIG.6
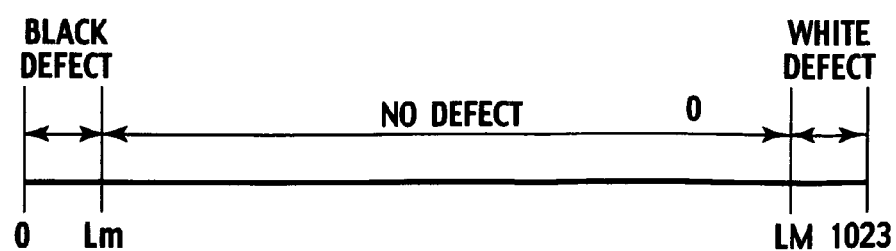

NOISE REDUCTION DEVICE, NOISE REDUCTION METHOD AND IMAGE CAPTURING DEVICE

CROSS REFERENCE TO RELATED APPLICATIONS

This application is based upon and claims the benefit of priority from prior Japanese Patent Applications P2004-94594 filed on Mar. 29, 2004 and P2004-289324 filed on Sep. 30, 2004; the entire contents of which are incorporated by reference herein.

BACKGROUND OF THE INVENTION

1. Filed of the Invention

The present invention relates to a noise reduction device and a noise reduction method, which reduces noise of a video signal by correcting signal values of pixels based on a relation between a target pixel and each of a plurality of peripheral pixels which are located around the target pixel. The present invention also relates to an image pickup apparatus having the noise reduction device. Particularly, the present invention relates to a noise reduction device and a noise reduction method which reduces noise of a video signal containing a color signal, and to an image pickup apparatus having the noise reduction device.

2. Description of the Related Art

A video signal obtained by image pick-up by use of a solid-state image pickup device such as a CCD (Charge Coupled Device) and a C-MOS sensor is a signal in which noise is superimposed on pixels, due to variations in characteristics among the pixels, influence of wiring resistances and the like. Therefore, a noise reduction circuit to reduce the noise superimposed in the video signal output from the solid-state image pickup device has heretofore been provided in a circuit at a rear stage behind the solid-state image pickup device.

In most of such noise reduction devices, by use of each of the signal values of a plurality of peripheral pixels existing within a predetermined range, a center of which is a target pixel to be subjected to a noise reduction processing, and by use of a correlation between the target pixel and each of the peripheral pixels, a signal value in which noises are averaged is obtained. This signal value is used as a signal value of the target pixel. At this time, presence of the correlation between the target pixel and each of the peripheral pixels is judged by comparing the difference of the signal value between the target pixel and each of the peripheral pixels with a threshold value. Subsequently, the number of peripheral pixels correlated with the target pixel is counted, and a sum of the signal values of peripheral pixels correlated with the target pixel and the signal value of the target pixel is obtained. An average value obtained by use of the number of peripheral pixels and the sum of the signal values of the pixels is used as the signal value of the target pixel, whereby noises are removed.

In addition, as a technology using the signal values of the peripheral pixels correlated with the target pixel as described above, a noise reduction device has been proposed, in which a threshold value to judge the presence of the correlation and an area where the peripheral pixels used are included are switched based on the signal value of the target pixel, any one of an average value and a variance for one frame, and an average value of high frequency components (see Japanese Patent Laid-Open No. 2003-179779).

SUMMARY OF THE INVENTION

However, in a video signal output from a solid-state image pickup device in which plural kinds of color filters are provided, the same color signals are adjacent to each other for every two pixels. Accordingly, even when a correlation is actually high, the noise reduction processing may be performed based on the premise that there is no correlation. Specifically, color filters respectively provided for directly adjacent pixels (adjacent to each other every one pixel) in the solid-state pickup device are different from each other in their kinds, so that these color filters have different light transmittances. Accordingly, even if the quantities of incident light are equal, the signal values of the video signals from the pixels directly adjacent to each other are different. Therefore, it is difficult to perform an appropriate noise reduction processing.

In view of such a problem, an object of the present invention is to provide a noise reduction device and a noise reduction method, which are capable of performing noise reduction processing more appropriately. In addition, another object of the present invention is to provide an image pickup apparatus having the noise reduction device.

In order to achieve the objects, a first aspect of the present invention is to provide a noise reduction device reducing a noise superimposed on video signals including plural kinds of color signals, each of which is output by a pixel, which includes a first signal reading-out unit for reading out a video signal of a target pixel for which a noise reduction is performed; a second signal reading-out unit for reading out video signals of external peripheral pixels arranged around internal peripheral pixels arranged at positions closest to the target pixel, the external peripheral pixels being arranged at positions closest to the target pixel in radial directions from the target pixel and outputting the same color signals as the video signal of the target pixel; a selection controller for judging presence of a correlation between a video signal of the target pixel and a video signal of each of the external peripheral pixels based on a relation between a signal value of the video signal of the target pixel and a signal value of the video signal of each of the external peripheral pixels; a signal calculator for calculating the signal value of the video signal of the target pixel by use of the signal value of the video signal of each of the external peripheral pixels; and a selector for selecting the signal value of the video signal of the target pixel calculated by the signal calculator when it is judged by the selection controller that the number of the video signals of the external peripheral pixels having correlation with the video signal of the target pixel is large.

According to this aspect, each of the external peripheral pixels is one pixel away from the target pixel, and outputs the same color signal as the target pixel. Further, based on the relation between the signal value of the video signal of each of the external peripheral pixels, whose color signals are the same, and the signal value of the video signal of the target pixel, the selection controller judges whether there is the relation between each of the external peripheral pixels and the target pixel. Therefore, the correlation between each of the external peripheral pixels and the target pixel can be comprehended more accurately. Accordingly, it is possible to perform the noise reduction processing more accurately.

In such a noise reduction device, the device may further include a third signal reading-out unit for reading out video signals of internal peripheral pixels arranged around the target pixel and at positions closest to the target pixel in radial directions from the target pixel, wherein the selection controller may judge presence of a correlation between the video signal of the target pixel and the video signal of each of the external peripheral pixel based on the relation between the signal value of the video signal of the target pixel and the signal value of the video signal of each of the external peripheral pixels and based on a relation between signal values of the video signals of the respective internal peripheral pixels.

Based on a difference between the signal value of the video signal of the target pixel and the signal value of the video signal of each of the external peripheral pixels and based on a difference between signal values of video signals of the respective internal peripheral pixels, presence of the correlation between the video signal of the target pixel and the video signal of each of the external peripheral pixels is judged. The difference between the signal values of the internal peripheral pixels is obtained by subtracting the signal values of the video signals of the internal peripheral pixels whose color signals are the same.

Furthermore, in the signal calculator, by calculating a weighted sum of the signal values of the video signals of the external peripheral pixels, or by calculating a weighted sum where the signal value of the video signal of the target pixel is added to the signal value of the video signal of each of the external peripheral pixels, the signal value of the video signal of the target pixel may be determined.

In such a noise reduction device, when the number of the external peripheral pixels are provided by n (n: a natural number), the n external peripheral pixels are first through n-th external peripheral pixels, the n internal peripheral pixels are first through n-th internal peripheral pixels, and a direction of the k-th (k: a natural number satisfying $1 \leq k \leq n$) external peripheral pixel with respect to the target pixel and a direction of the k-th internal peripheral pixel with the target pixel are the same, the device may further include a first correlation value calculator for determining first to n-th main correlation values respectively indicating presence of the correlations between the respective video signals of the first through n-th external peripheral pixels and the video signal of the target pixel, based on results obtained by subtracting the signal value of the video signal of the target pixel, which has been read out by the first signal reading-out unit, from the respective signal values of the video signals of the first through n-th external peripheral pixels, which has been read out by the second signal reading-out unit; and a second correlation value calculator for determining first through n-th sub-correlation values respectively indicating presence of the correlations between the respective video signals of the first through n-th external peripheral pixels and the video signal of the target pixel, based on a result obtained by subtracting the signal values of the video signals of the internal peripheral pixels existing at a position symmetrical to the respective first through n-th internal peripheral pixels around the target pixel from the signal values of the video signals of respective first through n-th internal peripheral pixels, which have been read out by the second signal reading-out unit, and the selection controller may judge presence of the correlation 4 between the video signal of each of the first through n-th external peripheral pixels and the video signal of the target pixel based on the first to n-th main correlation values and the first through n-th sub-correlation values.

In such a noise reduction device, the first through n-th main correlation values and the first through n-th sub-correlation values are respectively binarized values; the first correlation value calculator may set the value of the k-th main correlation value to be a value indicative of presence of a correlation with the video signal of the target pixel, when a value obtained by subtracting the signal value of the video signal of the target pixel from the signal value of the video signal of the k-th external peripheral pixel is in a range from a first threshold value to a second threshold value; and the second correlation value calculator may set the value of the k-th sub-correlation value to be a value indicative of presence of a correlation with the video signal of the target pixel, when a value obtained by subtracting the signal value of the video signal of each of the internal peripheral pixel existing at a position symmetrical to the k-th internal peripheral pixel around the target pixel from the signal value of the video signal of the k-th internal peripheral pixel is in a range from a third threshold value to a forth threshold value.

On this occasion, with respect to each of the k-th main correlation value and the k-th sub-correlation value, the correlation value may be "1" which indicates there is a correlation with the video signal of the target pixel, or may be "0" which indicates that there is no correlation with the video signal of the target pixel.

It is preferable that the noise reduction device further includes a threshold value calculator for determining the first and second threshold values by use of the signal values of the video signals of the external peripheral pixels.

It is also preferable that the threshold value calculator determines the first and second threshold values by use of an average value of the signal values of the video signals of the external peripheral pixels.

The main correlation value indicating presence of the correlation with the video signal of the target pixel may be defined as a correlated main correlation value, and the sub-correlation value indicating presence of the correlation with the video signal of the target pixel may be defined as a correlated sub-correlation value; the selection controller may compare the total number of the correlated main correlation values with a first predetermined number, and the selection controller may judge the number of the video signals of the external peripheral pixels having the correlation with the video signal of the target pixel to be small when the total number of the correlated main correlation values is smaller than the first predetermined number; and the selection controller may judge the number of the video signals of the external peripheral pixels having the correlations with the video signal of the target pixel to be large when the total number of the correlated main correlation value is the first predetermined value or more.

On this occasion, with respect to each of the k-th main correlation value and the k-th sub-correlation value, the value may be "1" which indicates that there is the correlation with the video signal of the target pixel or may be "0" which indicates that there is no correlation with the video signal of the target pixel.

The selection controller may compare the total number of the correlated main correlation values with a second predetermined number larger than the first predetermined number when the total number of the correlated main correlation values is the first predetermined number or more and: if the selection controller judges that the total number of the correlated main correlation values is in a range from the first predetermined number to the second predetermined number, the selector may select a weighted average value of the video signals of the external peripheral pixels corresponding to the correlated main correlation values calculated by the signal calculator; and if the selection controller judges that the total number of the correlated main correlated values is larger than the second predetermined number, the selector may select a weighted average value of the video signals of the external peripheral pixels corresponding to both of the correlated main correlation values and the correlated sub-correlated values, which have been calculated by the signal calculator.

On this occasion, in the signal calculator, a weighted average value of the video signals of the external peripheral pixels corresponding to the correlated main correlation values is obtained in such a manner that values, which are obtained by respectively multiplying the first to n-th main correlation values with the signal values of the video signals of the first to n-th external peripheral pixels, are integrated, and then the integrated value is divided by a value obtained by integrating the first to n-th main correlation values. In addition, in the signal calculator, a weighted average value of the video signals of the external peripheral pixels is obtained in such a manner that values, which are obtained by respectively multiplying the first to n-th main correlation values and the first to n-th sub-correlation values with the signal values of the video signals of the first to n-th external peripheral pixels, are integrated, and then the integrated value is divided by a value which is obtained by respectively multiplying the first to n-th main correlation values with the first to n-th sub-correlation values.

When it is judged that the number of the video signals of the external peripheral pixels having the correlation with the video signal of the target pixel is small, the selector selects the signal value of the video signal of the target pixel, which has been read out by the first signal reading-out unit.

Further, when the selection controller judges that the number of the external peripheral pixels having correlation with the video signal of the target pixel is small, the selection controller may compare the signal value of the video signal of the target pixel, which has been read out by the first signal reading-out unit, with a first predetermined value and a second predetermined value, and: if the selection controller judges that the signal value of the video signal of the target pixel is in either of a range smaller than the first predetermined value and a range larger than the second predetermined value, the selector may select a weighted average value of the video signals of the external peripheral pixels corresponding to the correlated sub-correlation value calculated by the signal calculator; and if the selection controller judges that the signal value of the video signal of the target pixel is in a range from the first predetermined value to a second predetermined value, the selector may select the signal value of the video signal of the target pixel which has been read out by the first signal reading-out unit.

On this occasion, with respect to each of the k-th main correlation value and the k-th sub-correlation value, the value may be "1" indicating that there is a correlation with the video signal of the target pixel, or may be "0" indicating that there is no correlation with the video signal of the target pixel. In the signal calculator, a weighted average value of the video signals of the external peripheral pixels corresponding to the correlated main correlation values is obtained in such a manner that values, which are obtained by multiplying the first to n-th sub-correlation values with the respective signal values of the video signals of the first to n-th external peripheral pixels, are integrated, and then the integrated value is divided by a value obtained by integrating the first to n-th main correlation values.

It is preferable that the noise reduction device further includes a predetermined value calculator for determining the first and second predetermined values by use of the signal values of the video signals of the external peripheral pixels.

It is preferable that the predetermined value calculator determines the first and second predetermined values by use of a value which indicates a magnitude of variations of the signal values of the video signals of the external peripheral pixels.

A second aspect of the present invention is to provide a noise reduction device of the present invention which includes, in the noise reduction device reducing a noise superimposed on a video signal including plural kinds of color signals, each of which is output by a pixel: based on a relation between a signal value of the video signal of the target pixel and a signal value of the video signal of each of external peripheral pixels arranged at positions close to the target pixel among pixels outputting the same color signals as that of the target pixel for which a noise reduction is performed, a selection controller for judging presence of a correlation between the video signal of the target pixel and the video signal of each of the external peripheral pixels; and a selector for selecting a signal value output as the signal value of the video signal of the target pixel from a signal value calculated by use of the signal value of the video signal of each of the external peripheral pixels and the signal value of the video signal of the target pixel, in accordance with a result judged by the selection controller.

The selection controller may judge presence of a correlation between the video signal of the target pixel and the video signal of each of the external peripheral pixels based on a relation between the signal value of the video signal of the target pixel and the signal value of the video signal of each of the external peripheral pixels and based on a relation between signal values of video signals of internal peripheral pixels arranged at positions adjacent to the target pixel.

The noise reduction device may further include an external defect judgment unit for judging whether a defect has occurred in each of the external peripheral pixels, and the external peripheral pixels used for reducing the noise of the target pixel may be configured to be such external peripheral pixels that have been judged by the external defect judgment unit to be those where the defect has not occurred.

The external defect judgment unit may be configured to judge that the defect has not occurred when the signal value of the video signal of each of the external peripheral pixels is in a range from a third to a fourth predetermined value.

Incidentally, the third predetermined value may be the same value as the first predetermined value, and the fourth predetermined values may be the same value as the second predetermined value.

A third aspect of the present invention is to provide an image pickup apparatus of the present invention which includes a solid state image pickup device having plural kinds of color filters provided on surfaces of pixels and outputting video signals made to be plural kinds of color signals; and any of the foregoing noise reduction devices, to which the video signals from the solid state image pickup device are input.

In such an image pickup apparatus, an arrangement of the color filters may be tetragonal, or may be honeycomb. Furthermore, the color filter may be a primary-color-based color filter.

A fourth aspect of the present invention is to provide a noise reduction method of the present invention which includes, in a noise reduction method of reducing a noise superimposed on a video signal including plural kinds of color signals, each of which is output by a pixel,: a step of reading out a video signal of a target pixel for which a noise reduction is performed; a step of reading out video signals of external peripheral pixels arranged around internal peripheral pixels arranged at positions closest to the target pixel, the external peripheral pixels being arranged at positions closest to the target pixel in radial directions from the target pixel and outputting the same color signals as the video signal of the target pixel; a step of judging presence of a correlation between the video signal of the target pixel and a video signal of each external peripheral pixel based on a relation between a signal value of the video signal of the target pixel and a signal value of the video signal of each of the external peripheral pixels; a step of calculating the signal value of the video signal of the target pixel by use of the signal values of the video signals of the external peripheral pixels; and a step of selecting and outputting the signal value of the video signal of the target pixel calculated by use of the signal values of the video signals of the external peripheral pixels when it is judged that the number of the video signals of the external peripheral pixels having correlations with the video signal of the target pixel is large.

Furthermore, a noise reduction method may be configured to include, in a noise reduction method of reducing a noise superimposed on a video signal including plural kinds of color signals, each of which is output by a pixel: a step of judging presence of a correlation between a video signal of a target pixel and a video signal of each of the external peripheral pixels based on a relation between a signal value of the video signal of the target pixel and a signal value of the video signal of each of external peripheral pixels arranged at positions in the proximity of the target pixel among pixels outputting the same color signals as that of the target pixel for which a noise reduction is performed; and a step of selecting a signal value output as the signal value of the video signal of the target pixel from a signal value calculated by use of the signal values of the video signals of the external peripheral pixels and a signal value of the video signal of the target pixel, in accordance with a judged result.

BRIEF DESCRIPTION OF THE DRAWINGS

FIG. 4 is a diagram showing an arrangement relation among a target pixel and peripheral pixels in the solid-state image pickup device of the image pickup apparatus in FIG. 1;

FIGS. 5A and 5B are diagrams showing a relation between a signal value and a threshold value at the time when a correlation value is obtained by a correlation value calculator;

FIG. 6 is a diagram showing a relation between a signal value and a threshold value at the time when a white defect and a black defect are judged by a defect judgment unit;

DETAILED DESCRIPTION OF THE INVENTION

First Embodiment

Figures 1, 2:
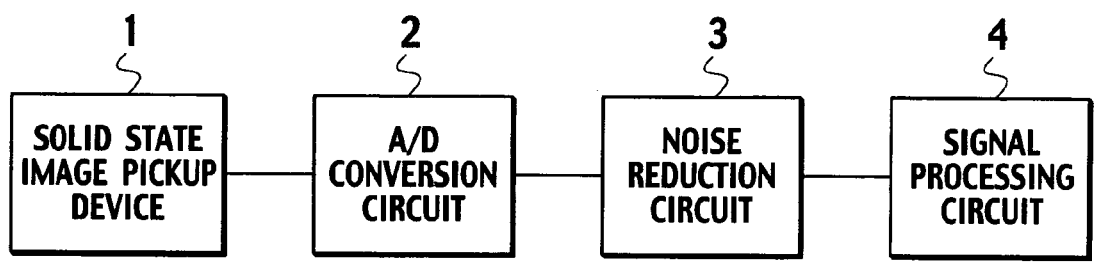
FIG. 1 is a block diagram showing an internal constitution of an image pickup apparatus of an embodiment according to the present invention.
FIG. 2 is a diagram showing an arrangement of filters arranged in a solid-state image pickup device provided in the image pickup apparatus of FIG. 1.

An embodiment of the present invention will be described with reference to the drawings. FIG. 1 is a block diagram showing an internal configuration of an image pickup apparatus having a noise reduction circuit in this embodiment.

The image pickup apparatus of FIG. 1 includes a solid-state image pickup device 1 having a plurality of pixels, each outputting a video signal which is an electrical signal in accordance with a quantity of incident light of an object; an A/D conversion circuit 2 for converting the vide signal obtained by the solid-state image pickup device 1 to a digital signal; a noise reduction circuit 3 for performing a noise reduction for the video signal which is converted to the digital signal by the A/D conversion circuit 2; and a signal processing circuit 4 for performing a signal processing such as a white balance processing and a color balance processing for the video signal in which the noise is reduced by the noise reduction circuit 3. Note that the video signal is a signal including a color signal output from each pixel or a plurality of color signals output from the plurality of pixels.

In the image pickup apparatus having such a configuration, the image pickup device 1 is a solid-state image pickup device in which plural kinds of color filters having different light transmittances are provided on a surface of each pixel, that is, a single-plate solid-state image pickup device. In terms of color filters, different kinds of color filters are provided for the adjacent pixels. As an array type of color filters provided for such a solid-state image pickup device 1, there is a Bayer pattern filter array composed of an R (Red) filter, a G (Green) filter and a B (Blue) filter as shown in FIG. 2. The Bayer pattern filter array shown in FIG. 2 has a configuration such that a line in which G filters and R filters are alternately aligned in a horizontal direction and a line in which B filters and G filters are alternately aligned in a horizontal direction are alternately arranged in a vertical direction. In other words, a line in which G filters and B filters are alternately aligned in a vertical direction and a line in which R filters and G filters are alternately aligned in a vertical direction are alternately arranged in a horizontal direction.

In the solid-state image pickup device 1 having such a Bayer pattern filter array, a video signal which is any one of R, G and B signals is output from the pixel having each one of R, G and B filters. The video signal which is any one of the R, G and B signals is converted to a digital signal by the A/D conversion circuit 2, and supplied to the noise reduction circuit 3. Presence of a correlation between a target pixel and each of the peripheral pixels is judged, and a correction process is performed by use of signal values of color signals output by the peripheral pixels having a correlation with the target pixel, whereby noise is reduced. The noise reduction processing is performed for each pixel in such a manner as described above, so that the noise superimposed on the video signals constituted by the R, G and B signals is reduced.

The video signal from which the noise is removed by the noise reduction circuit 3 is supplied to the signal processing circuit 4. In the signal processing circuit 4, a signal processing such as a white balance processing, a color balance processing and an interpolation processing is performed for each of the R, G and B signals constituting the video signals. Then, the video signal obtained by performing the predetermined signal processing in the signal processing circuit 4 is output. The video signal output is recorded onto a recording medium, or reproduced by a display device.

Figure 3:
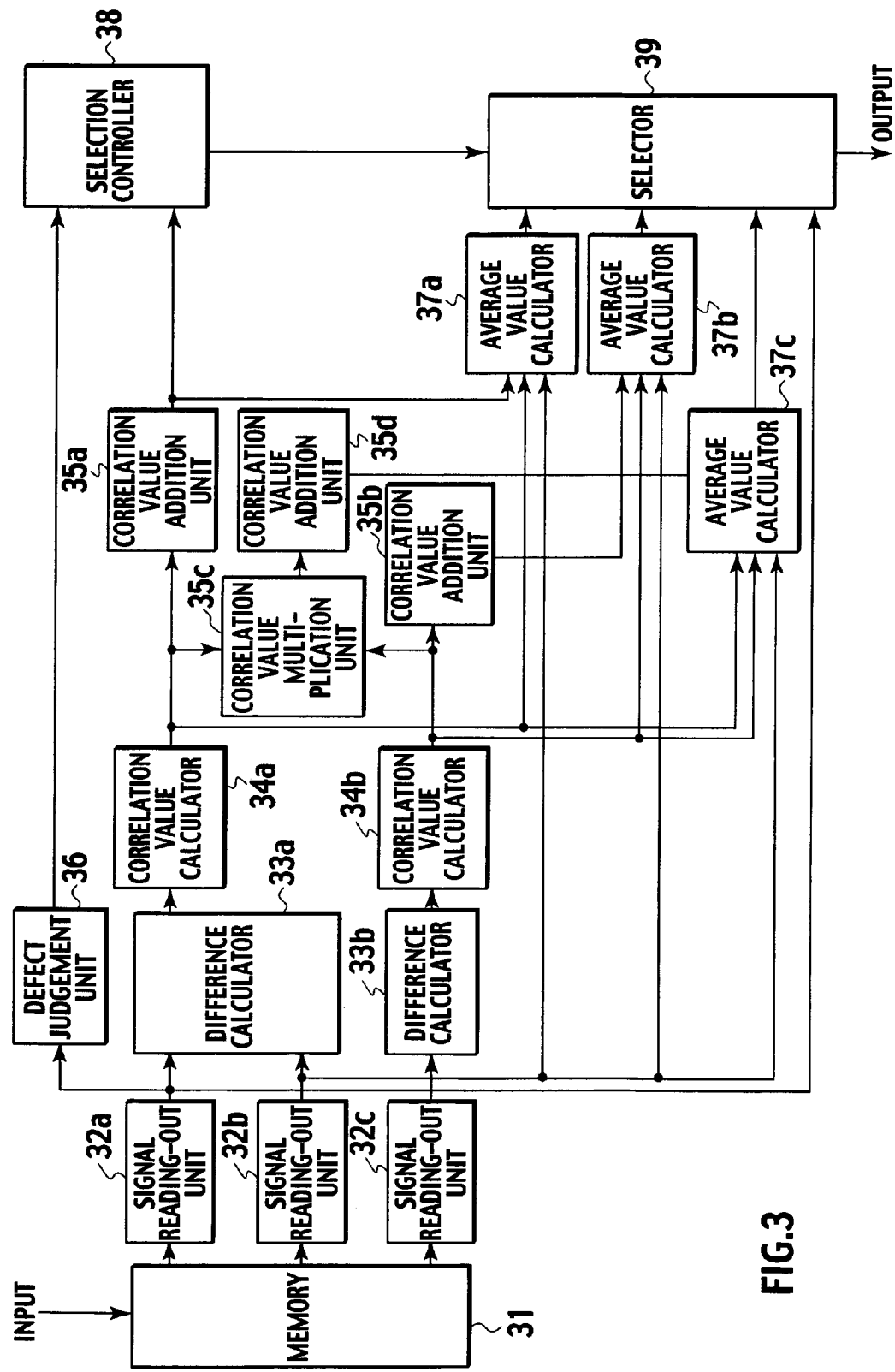
FIG. 3 is a block diagram showing an internal constitution of a noise reduction circuit provided in the image pickup apparatus of FIG. 1.

Descriptions of the noise reduction circuit 3 in the image pickup apparatus, which operates as described above, will be made. FIG. 3 is a block diagram showing an internal configuration of the noise reduction circuit provided in the image pickup apparatus of FIG. 1. As shown in FIG. 3, the noise reduction circuit 3 includes a memory 31 for storing the video signal converted to the digital signal by the A/D conversion circuit 2; a signal reading-out unit 32a for reading out the video signal of the target pixel, for which a noise reduction processing is to be performed, from the memory 31; a signal reading-out unit 32b for reading-out a video signal of each of peripheral pixels from the memory 31, which is positioned at a position separate from the target pixel with one pixels interposed there between and provided with the same kind of color filter; and a signal reading-out unit 32c for reading out a video signal of each of peripheral pixels from the memory 31, which is positioned one pixel away from the target pixel.

Furthermore, the noise reduction circuit 3 includes a difference calculator 33a for obtaining a difference between a signal value of the video signal of the target pixel and a signal value of the video signal of each of the peripheral pixels, which have been respectively read out by the signal reading-out units 32a and 32b; a difference calculator 33b for obtaining a difference between two signal values among the signal values of the video signals of the peripheral pixels which have been read out by the signal reading-out unit 32c; a correlation value calculator 34a for comparing the difference obtained by the difference calculator 33a with a threshold value so as to obtain a correlation value of each of the peripheral pixels; a correlation value calculator 34b for comparing the difference obtained by the difference calculator 33b with a threshold value to a correlation value of each of the peripheral pixels; a correlation value addition unit 35a for obtaining a total sum of the correlation values obtained by the correlation value calculator 34a; a correlation value addition unit 35b for obtaining a total sum of the correlation values obtained by the correlation value calculator 34b; a correlation value multiplication unit 35c for multiplying the correlation values obtained respectively by the correlation value calculation units 34a and 34b; a correlation value addition unit 35d for obtaining a total sum of the correlation values multiplied by the correlation value multiplication unit 35c; and a defect judgment unit 36 for judging whether the video signal read out by the signal reading-out unit 32a is a white defect or a black defect.

Furthermore, the noise reduction circuit 3 includes an average value calculator 37a for obtaining a weighted average value of the signal values of the peripheral pixels which have been judged by the correlation value calculator 34a to have correlations with the target pixel; an average value calculator 37b for obtaining a weighted average value of the signal values of the peripheral pixels which have been judged by the correlation value calculator 34b to have correlations with each other; an average value calculator 37c for obtaining a weighted average value of the signal values of the peripheral pixels which have been judged by the correlation value calculation units 34a and 34b to have the correlations with the target pixel; a selection controller 38 for controlling a selector 39 to be described later, based on a calculation result of the correlation value addition unit 35a and a judgment result of the defect judgment unit 36; and the selector 39, which is controlled by the selection controller 38 and selects any one of the signal value of the video signal of the target pixel and the signal values obtained by the average value calculators 37a to 37c to output the selected signal value as the signal value of the video signal of the target pixel. Herein, the weighted average value is an average value obtained for a plurality of values while the degree of consideration for each of these values is made different. In this embodiment, all of the weights in the cases where the weighted average values are calculated shall be one. Specifically, each of the plurality of signal values for which the average value is obtained is considered evenly.

Figure 7:
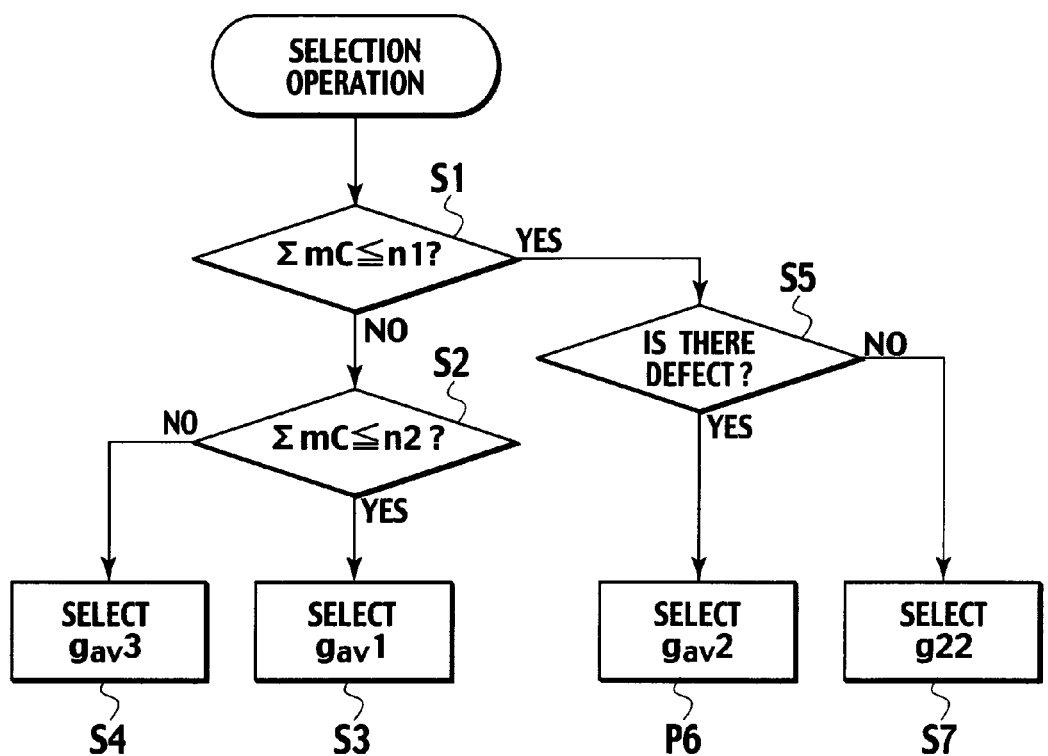
FIG. 7 is a flowchart showing an operation of a selection controller of the noise reduction circuit in FIG. 3.

An operation of the noise reduction circuit 3 configured as described above will be described with reference to the drawings. FIG. 4 is a diagram showing an arrangement relation between the target pixel and each of the peripheral pixels in the solid-state image pickup device 1. FIGS. 5A and 5B are diagrams, each showing a relation between a difference of the signal values and a threshold value at the time when a correlation value is obtained by the correlation value calculation units 34a and 34b. FIG. 6 is a diagram showing a relation between the signal value and a predetermined value at the time when a white defect and a black defect are judged by the defect judgment unit 36. FIG. 7 is a flowchart showing an operation of a selection controller 38.

As shown in FIG. 4, when five by five pixels with five lines in a horizontal direction and with five lines in a vertical direction are denoted as G00 to G44, and when a pixel G22 positioned at the center of the arrangement of FIG. 4 is the target pixel, the video signal of the pixel G22 is read out by the signal reading-out unit 32a. Specifically, the signal reading-out unit 32a is a first signal reading-out unit for reading out the video signal of the target pixel, for which the noise reduction is performed. Furthermore, the video signals output by the pixels G02, G42, G20 and G24, which are arranged respectively at positions one pixel away from the target pixel G22 in either of the horizontal and vertical directions, are read out as the video signals of the peripheral pixels by the signal reading-out unit 32b. The video signals output by the pixels G00, G44, G04 and G40, which are arranged respectively at positions one pixel away from the target pixel G22 in directions slanted from either of the horizontal and vertical directions by 45 degrees (hereinafter referred to as diagonal directions), are also read out as the video signals of the peripheral pixels as the signal reading-out unit 32b.

The video signals of the peripheral pixels G00, G02, G04, G20, G24, G40, G42 and G44 are R signals when the video signal of the target pixel G22 is an R signal. The video signals thereof are G signals when the video signal of the target pixel G22 is a G signal. The video signals thereof are B signals when the video signal of the target pixel G22 is a B signal. In other words, the peripheral pixels G00, G02, G04, G20, G24, G40, G42 and G44 are pixels which output the same color signals as that of the target pixel G22. In addition, the peripheral pixels G00, G02, G04, G20, G24, G40, G42 and G44 are pixels arranged at the positions in the proximity of the target pixel G22. Furthermore, in the following descriptions, the peripheral pixels G00, G02, G04, G20, G24, G40, G42 and G44 are arranged at the positions one pixel away from the target pixel G22, are called "external peripheral pixels". Specifically, the peripheral pixels G00, G02, G04, G20, G24, G40, G42 and G44 are arranged around internal peripheral pixels arranged at positions closest to the target pixel G22, and are arranged at the positions closest to the target pixel G22 in radial directions from the target pixel G22, the peripheral pixels G00, G02, G04, G20, G24, G40, G42 and G44 outputting the same color signal as that of the target pixel G22. In addition, the signal reading-out unit 32b is a second signal reading-out unit for reading out the video signals of the external peripheral pixels. Note that in this embodiment, the number n of the external peripheral pixels is 8, and that the pixels G00, G02, G04, G20, G24, G40, G42 and G44 are the first to n-th external peripheral pixels, sequentially.

Furthermore, the video signals of the pixels G12, G32, G21 and G23, which are arranged at the positions adjacent to the target pixel G22 in either of the horizontal and vertical directions, and the video signals of the pixels G11, G33, G13 and G31, which are arranged at the positions adjacent to the target pixel G22 in the two diagonal directions, are read out by the signal reading-out unit 32c as the video signals of the peripheral pixels. Accordingly, when the video signal of the target pixel G22 is the R signal, the video signals of the peripheral pixels G11, G13, G31 and G33 are B signals, and the video signals of the G12, G21, G23 and G32 is G signals. When the video signal of the target pixel G22 is the B signal, the video signals of the G11, G13, G31 and G33 are G signals.

Furthermore, when the video signal of the target pixel G22 is the G signal, the video signals of the peripheral pixels G11, G13, G31 and G33 are a G signal, and the video signals of the G12, G21, G23 and G32 are either an R signal or a B signal. At this time, if the video signals of the peripheral pixels G12 and G32 are R signal, the video signals of the G21 and G23 are the B signal and if the video signals of the peripheral pixels G12 and G32 are the B signal, the video signals of the G21 and G23 are the R signal. As described above, the two peripheral pixels arranged so as to interpose the target pixel there between on the same straight line output the same color signal. In addition, in the following descriptions, the peripheral pixels G11, G12, G13, G21, G23, G32 and G33, which are arranged at positions next to the target pixel G22, that is, at positions closest (adjacent) to the target pixel G22 in radial directions from the target pixel G22, are called "internal peripheral pixels". In addition, the signal reading-out unit 32c is a third signal reading-out unit for reading out the video signals of the internal peripheral pixels. In this embodiment, the number n of the internal peripheral pixels also is 8, and the pixels G11, G12, G13, G21, G23, G31, G32 and G33 are the first to the n-th internal peripheral pixels, sequentially.

Accordingly, a direction extending from the k-th (k: a natural number satisfying $1 \leq k \leq 8$) external peripheral pixel to the target pixel and a direction extending from the k-th internal peripheral pixel to the target pixel are the same.

As described above, the video signal of the target pixel is read out by the signal reading-out unit 32a, and the video signals of the eight external peripheral pixels are read out by the signal reading-out unit 32b. The video signals of the eight internal peripheral pixels are read out by the signal reading-out unit 32c. Then, the signal value of the video signal of the target pixel, which has been read out by the signal reading-out unit 32a, and the signal values of the video signals of the external peripheral pixels read out by the signal reading-out unit 32b are supplied to the difference calculator 33a. In this difference calculator 33a, the signal value of the video signal of the target pixel is subtracted from the respective signal values of the video signals of the external peripheral pixels, and eight difference values (hereinafter referred to as "first difference values") are obtained. Each of the first difference values thus obtained is a value indicating a relation between the target pixel and each of the external peripheral pixels.

Specifically, when the signal values of the video signals in the respective pixels G00 through G44 are denoted as g00 through g44, the first difference values mD00, mD02, mD04, mD20, mD24, mD40 and mD44 are obtained in the following manners.

mD00=g00−g22
mD02=g02−g22
mD04=g04−g22
mD20=g20−g22
mD24=g24−g22
mD40=g40−g22
mD42=g42−g22
mD44=g44−g22

Furthermore, the signal values of the video signals of the internal peripheral pixels read out by the signal reading-out unit 32c are supplied to the difference calculator 33b. In this difference calculator 33b, eight difference values (hereinafter referred to as "second difference values") are obtained by performing subtractions between the signal values of the video signals of the two internal peripheral pixels existing at positions symmetrical to each other when the target pixel is taken as their center. Specifically, the second difference value is a result obtained by subtracting, from the signal value of the video signal of one of the n peripheral pixels, the signal value of the video signal of the other pixel, among the first to n-th internal peripheral pixels, existing at a position symmetrical to the one of the n peripheral pixels when the target pixel is taken as their center.

At this time, by use of the two internal peripheral pixels arranged on the same straight line, a difference value by subtracting one internal peripheral pixel from the other internal peripheral pixel and a difference value by subtracting the other internal peripheral pixel from one internal pixel are obtained. The second difference value obtained in the above described manner is a value indicating a correlation between the target pixel and the external peripheral pixel whose positional relation with the target pixel is the same as the positional relation between the two internal peripheral pixels used to obtain the second difference value.

Specifically, the second difference values sD00, sD02, sD04, sD20, sD24, sD40, sD42 and sD44 are obtained in the following manner.

sD00=g11−g33
sD02=g12−g32
sD04=g13−g31
sD20=g21−g23
sD24=g23−g21
sD40=g31−g13
sD42=g32−g12
sD44=g33−g11

Subsequently, the first difference values mDi (i represents 00, 02, 04, 20, 24, 40, 42 and 44), which have been obtained by the difference calculator 33a, are respectively supplied to the correlation value calculator 34a. The correlation value calculator 34a compares the first difference values mDi with threshold values −mth1 and mth2 (−1023<−mth1<0<mth2<1023). Note that "−mth1" indicates a first threshold value, and that "mth2" indicates a second threshold value. Based on the above comparison results, correlation values mCi (hereinafter referred to as "main correlation values mCi) are obtained, which is set to "1" for the peripheral pixels Gi judged to have correlations with the target pixel G22, and which is set to "0" for the peripheral pixels Gi judged to have no correlations with the target pixel G22. Note that in the A/D conversion circuit 2 of this embodiment, the video signal shall be output as a 10-bit digital signal (video signal having a signal value of 0 through 1023).

As shown in FIG. 5A, when the first difference value mDi is within the range expressed by −mth1≤mDi≤mth2, this correlation value calculator 34a judges that there is a correlation between the target pixel G22 and the peripheral pixel Gi, and sets the main correlation value mCi to "1". When the first difference value mDi is in the range expressed either by mDi<−mth1 or by mDi>mth2, the correlation value calculator 34a judges that there is no correlation between the target pixel G22 and the peripheral pixel Gi, and sets the main correlation value mCi to "0".

Note that the main correlation values mCi ("i" indicates 00, 02, 04, 20, 24, 40, 42 and 44) are first to n-th main correlation values indicating the presence of correlations between the respective video signals of the first to n-th external peripheral pixels and the video signal of the target pixel. In addition, note that the correlation value calculator 34a is a first correlation value calculator for obtaining first to n-th main correlation values.

The second difference values sDi obtained by the difference calculator 33b are respectively supplied to the correlation value calculator 34b. As shown in FIG. 5B, the correlation value calculator 34b compares the second difference values sDi with threshold values −sth1, sth2 (−1023<−sth1<0<sth2<1023). Based on the comparison results, correlation values sCi (hereinafter referred to as "sub-correlation values sCi") are obtained, which is set to "1" for the peripheral pixels Gi judged to have a correlation with the target pixel G22, and which is set to "0" for the peripheral pixels Gi judged to have no correlation with the target pixel G22.

As shown in FIG. 5B, when the second difference value sDi is within the range expressed by −sth1≦sDi≦sth2, the correlation value calculator 34b judges that there is a correlation between the target pixel G22 and the peripheral pixel Gi, and sets the sub-correlation value sCi to "1". In addition, when the second difference value sDi is in the range expressed either by sDi<−sth1 or by sDi>sth2, the correlation value calculator 34b judges that there is no correlation between the target pixel G22 and the peripheral pixel Gi, and sets the sub-correlation value sCi to "0".

Note that the sub-correlation values sCi ("i" indicates 00, 02, 04, 20, 24, 40, 42 and 44) are first to n-th sub-correlation values indicating the presence of correlations between the respective video signals of the first to n-th external peripheral pixels and the video signal of the target pixel. In addition, note that the correlation value calculator 34b is a second correlation value calculator for obtaining first to n-th sub-correlation values.

Then, the main correlation values mCi obtained by the correlation value calculator 34a are respectively supplied to the correlation value addition unit 35a, and the sub-correlation values sCi obtained by the correlation value calculator 34b are respectively supplied to the correlation value addition unit 35b. In the correlation value addition unit 35a, the main correlation values mCi are added up, and a total sum ΣmC is obtained. In the correlation value addition unit 35b, the sub-correlation values sCi are added up, and a total sum ΣsC is obtained. Specifically, the total sum ΣmC obtained by the correlation value addition unit 35a and the total sum ΣsC obtained by the correlation value addition unit 35b are obtained in the following manner.

$$\Sigma mC = mC00 + mC02 + mC04 + mC20 + mC24 + mC40 + mC42 + mC44$$

$$\Sigma sC = sC00 + sC02 + sC04 + sC20 + sC24 + sC40 + sC42 + sC44$$

Furthermore, the main correlation values mCi and the sub-correlation values sCi, which have been obtained by the respective correlation value calculators 34a and 34b, are supplied to the correlation value multiplication unit 35c. The correlation value multiplication unit 35c multiplies the main correlation values mCi and the sub-correlation values sCi, respectively. Then, the correlation value addition unit 35d adds up the values obtained by the above multiplications, thus obtaining a total sum Σ(mC*sC). Specifically, the total sum Σ(mC*sC) obtained by the correlation value multiplication unit 35c and the correlation value addition unit 35d is obtained in the following manner.

$$\Sigma(mC*sC) = mC00*sC00 + mC02*sC02 + mC04*sC04 + mC20*sC20 + mC24*sC24 + mC40*sC40 + mC42*sC42 + mC44*sC44$$

Note that the main correlation value and the sub-correlation value, which are multiplied with each other, are the k-th main correlation value and the k-th sub-correlation value by the same k. Accordingly, the main correlation value and the sub-correlation value, which are multiplied with each other, are correlation values respectively relating to the external peripheral pixels and the internal peripheral pixels in the same direction with respect to the target pixel.

Furthermore, the video signal read out by the signal reading-out unit 32a is supplied to the defect judgment unit 36. The defect judgment unit 36 compares the signal value of the video signal of the target pixel with each of predetermined values Lm and LM (0<Lm<LM<1023), as shown in FIG. 6. Specifically, the defect judgment unit 36 confirms whether the signal value g22 of the video signal of the target pixel G22 is in the range expressed by Lm<g22<LM. Note that Lm is a first predetermined value and LM is a second predetermined value. Then, when the signal value g22 is in the range expressed by g22<Lm, the defect judgment unit 36 judges that a black defect occurred in the target pixel G22. When the signal value g22 is in the range expressed by g22>LM, the defect judgment unit 36 judges that a white defect occurred in the target pixel G22. In addition, when the signal value g22 is in the range expressed by Lm<g22<LM, the defect judgment unit 36 judges that there is no defect in the target pixel G22. Note that the black defect and the white defect are signals which are generated by a structural malfunction and the like of pixels constituting the solid-state image pickup device 1.

In the above described manner, respectively in the correlation value addition units 35a and 35b, the total sums of the correlation values respectively of the external peripheral pixels and of the internal peripheral pixels are obtained. In addition, the total sum of the integrated values of the correlation values of the respective external peripheral pixels and the respective internal peripheral pixels are obtained in the correlation value addition unit 35d. Furthermore, in the defect judgment unit 36, the presence of the defect in the target pixel is judged. At this time, the average value calculators 37a to 37c carry out operations in the following manner.

First, the signal values gi of the video signals of the external peripheral pixels Gi read out by the signal reading-out unit 32b, the correlation values mCi obtained by the correlation value calculator 34a, and the total sum ΣmC obtained by the correlation value addition unit 35a are respectively supplied to the average value calculator 37a. Subsequently, in the average value calculator 37a, a weighted average value $g_{av}1$ of the signal values of the video signals having correlations with the target pixel is obtained. Specifically, a value obtained by adding the signal values gi having the correlation values mCi of "1" is divided by the total sum ΣmC, thus the weighted average value $g_{av}1$ is obtained.

$$g_{av}1 = (g00*mC00 + g02*mC02 + g04*mC04 + g20*mC20 + g24*mC24 + g40*mC40 + g42*mC42 + g44*mC44)/\Sigma mC$$

In addition, the signal values gi of the video signals of the external peripheral pixels Gi read out by the signal reading-out unit 32b, the correlation values sCi obtained by the correlation value calculator 34b, and the total sum ΣsC obtained by the correlation value addition unit 35b are respectively supplied to the average value calculator 37b. Subsequently, in the average value calculator 37b, a weighted average value $g_{av}2$ of the signal values of the video signals having correlations with the target pixel is obtained. Specifically, a value obtained by adding the signal values gi having the correlation values sCi of "1" is divided by the total sum ΣsC, thus the weighted average value $g_{av}2$ is obtained.

$$g_{av}2 = (g00*sC00 + g02*mC02 + s04*sC04 + g20*sC20 + g24*sC24 + g40*sC40 + g42*sC42 + g44*sC44)/\Sigma sC$$

Furthermore, the signal values gi of the video signals of the external peripheral pixels Gi read out by the signal reading-out unit 32b, the correlation values mCi and sCi obtained by the correlation value calculators 34a and 34b, and the total sum Σ(mC*sC) obtained by the correlation value addition unit 35d are respectively supplied to the average value calculator 37c. Subsequently, in the average value calculator 37c, a weighted average value $g_{av}3$ of the signal values of the video signals having correlations with the target pixel is obtained. Specifically, a value obtained by adding the signal values gi having the correlation values mCi*sCi of "1" is divided by the total sum Σ(mC*sC), thus the weighted average value $g_{av}3$ is obtained.

$$g_{av}3 = (g00*mC00*sC00 + g02*mC02*sC02 + g04*mC04*sC04 + g20*mC20*sC20 + g24*mC24*sC24 + g40*mC40*sC40 + g42*mC42*sC40 + g44*mC44*sC44)/\Sigma(mC*sC)$$

Each of the units carries out an operation in the above described manner. The selection controller 38 performs an operation to judge presence of a correlation between the video signals of the target pixel and of each of the external peripheral pixels in accordance with the flowchart of FIG. 7, whereby the selector 39 is controlled. First, the selection controller 38 judges whether the total sum ΣmC from the correlation value addition unit 35a is n1 or less (S1). Herein, n1 is a first predetermined number compared with the total number of the main correlation value mC having a value of "1". Specifically, in S1, it is judged whether the number of the external peripheral pixels having correlations with the target pixel G22 is n1 or less, and when the number of the pixels is judged to be larger than n1, the selection controller 38 judges that there is a correlation with the external peripheral pixels. Then, when the total sum ΣmC is larger than n1 (No), it is judged whether the total sum ΣmC is n2 or less (S2). Herein, n2 is a second predetermined value larger than the first predetermined value n1.

In S2, it is judged whether the number of the external peripheral pixels having correlations with the target pixel G22 is n2 or less, and when the number of the pixels is n2 or less (YES), the selection controller 38 judges, by use of the correlations with the external peripheral pixels, a direction where the correlation is stronger. In addition, when the number of the pixels is larger than n2 (NO), the selection controller 38 judges, by use of the respective correlations of the external and internal peripheral pixels, a direction where the correlation is stronger. Specifically, when the number of the external peripheral pixels having the correlation with the target pixel G22 is n2 or more, the selection controller 38 confirms the external peripheral pixels having strong correlations with the video signal of the target pixel, based on the first to n-th main correlation values and the first to n-th sub-correlation values.

Accordingly, when the total sum ΣmC is n2 or less (YES), the weighted average value $g_{av}1$ of the external peripheral pixels, which has been obtained by the average value calculator 37a, is selected by the selector 39, and is output as the signal value of the video signal of the target pixel G22 (S3). In addition, when the total sum ΣmC is larger than n2 (NO), the weighted average value $g_{av}3$ of the external peripheral pixels, which has been obtained by the average value calculator 37c, is selected by the selector 39, and is output as the signal value of the video signal of the target pixel G22 (S4).

Furthermore, when the total sum ΣmC is n1 or less in S1 (YES), the defect judgment unit 36 judges, based on the judgment result of the defect judgment unit 36, whether either a white defect or a black defect exists in the target pixel G22 (S5). Then, when it is judged that either a white defect or a black defect exists in the target pixel G22 (YES), the selection controller 38 judges, by use of the correlation of the internal peripheral pixel, a direction where the correlation is stronger. Accordingly, the weighted average value $g_{av}2$ of the internal peripheral pixels obtained by the average value calculator 37b is selected by the selector 39, and output as the signal value of the video signal of the target pixel G22 (S6). In addition, when it is judged that either of the white and black defects does not exist in the target pixel G22 (NO), it is judged that the signal value of the video signal of the target pixel G22 is an independent value which has no correlation with the external and internal peripheral pixels. Accordingly, the signal value g22 of the video signal of the target pixel G22, which has been read out by the signal reading-out unit 32a, is selected by the selector 39, and output as the signal value of the video signal of the target pixel G22 (S7).

The video signal of the target pixel, which has been thus selected by the selector 39, is output to the signal processing circuit 4 in the subsequent stage as a video signal in which noises are reduced. Thus, the video signal is subjected to various kinds of signal processing in the signal processing circuit 4.

Specifically, in accordance with the result judged by the selection controller 38, any one of the average value calculators 37a to 37c functions as a signal calculation unit for calculating the signal value of the video signal of the target pixel by use of the signal values of the video signals of the external peripheral pixels. In addition, in accordance with the result confirmed by the selection controller 38, the selector 39 selects a signal value output as the signal value of the video signal of the target pixel from among the $g_{av}1$, $g_{av}2$, $g_{av}3$, and the signal value of the video signal of the target pixel G22, where the $g_{av}1$, $g_{av}2$ and $g_{av}3$ are the signal values calculated by use of the signal values of the video signals of the external peripheral pixels.

(Effects)

Each of the external peripheral pixels is one pixel away from the target pixel, and outputs the same color signal as the target pixel. In addition, based on the relation between the signal value of the video signal of each of the external peripheral pixels, which is the same color signal as the target pixel, and the signal value of the video signal of the target pixel, the selection controller 38 judges whether there is the correlation between the external peripheral pixel and the target pixel. Therefore, the correlation between the external peripheral pixel and the target pixel can be comprehended accurately. Accordingly, it is possible to perform the noise reduction processing more accurately.

Furthermore, since the external peripheral pixels are arranged at the positions which are one pixel away from the target pixel, a degree of correlation between the video signals is lower than that of the pixels adjacent to each other. Therefore, as in the case where a pixel irrelevant to the target pixel exists between the external peripheral pixel and the target pixel, even when the correlation between the external peripheral pixel and the target pixel is practically low, it may be judged that there is correlation, in the case where the signal value of the video signal of the external peripheral pixel and the signal value of the video signal of the target pixel are approximately equal to each other accidentally. In this case, since the average value calculation for the signal values of the video signals of the peripheral pixels is performed whereby the noise reduction processing is performed, there is a possibility that degradation of the resolution is brought about. However, in this embodiment, after considering not only the relation between the external peripheral pixel and the target pixel but also the relation between the internal peripheral pixels, presence of a correlation between the external peripheral pixel and the target pixel is judged. Accordingly, it is possible to suppress degradation of the resolution while performing the noise reduction processing more appropriately.

The provision of the noise reduction circuit according to this embodiment makes it possible to realize the noise reduction device. In addition, the noise reduction method can be realized by use of the noise reduction circuit according to this embodiment.

In an image pickup apparatus for picking up dynamic images and static images, it is possible to reduce a noise more appropriately by use of the noise reduction circuit according to this embodiment. Particularly, the noise reduction circuit according to this embodiment can be applied to an image pickup apparatus having a single plate solid-state image pickup device such as a CCD and a CMOS sensor.

Second Embodiment

Figure 8:
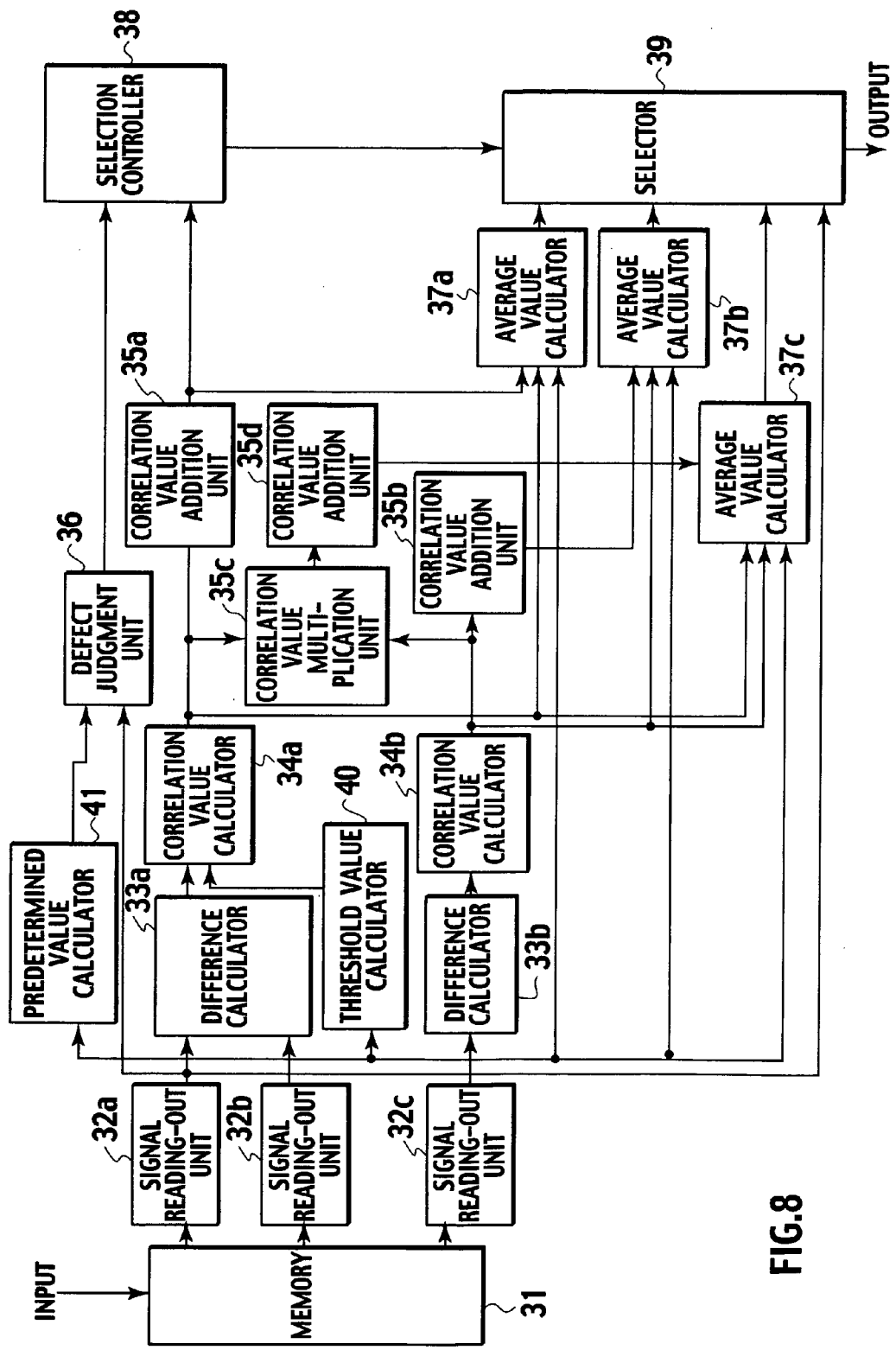
FIG. 8 is another block diagram showing an internal constitution of the noise reduction circuit provided in the image pickup apparatus of FIG. 1.

As shown in FIG. 8, a noise reduction circuit in a second embodiment includes a threshold value calculator 40 and a predetermined value calculator 41 in addition to the internal components provided in the noise reduction circuit in the first embodiment. Note that the same parts as those in the first embodiment are denoted by the same reference numerals and descriptions of them are omitted.

The threshold value calculator 40 obtains threshold values −mth1 and mth2 by use of the video signal of each of the external peripheral pixels. Furthermore, the threshold value calculator 40 obtains the threshold values −mth1 and mth2 by use of an average value of the video signals of the external peripheral pixels.

To be concrete, the threshold value calculator 40 acquires the signal values of the video signals of the external peripheral pixels from the signal reading-out unit 32b, and divides the total sum of the signal values by the number of the external peripheral pixels, thus obtaining an average value $g_{av}4$. Specifically, the average value $g_{av}4$ is obtained by the following equation.

$$g_{av}4=(g00+g02+g04+g20+g24+g40+g42+g44)/8$$

By use of a product of the obtained average value $g_{av}4$ with a suitable adjusting value adj1, the threshold value calculator 40 obtains −mth1 and mth2 in the following manner.

$$-mth1=-g_{av}4*adj1$$

$$mth2=g_{av}4*adj1$$

Note that adj1 should be set to a value which is considered to be suitable in the range of 0 to 1 after performing the noise reduction processing actually. adj1 is set to, for example, ⅛.

The threshold values, which have been obtained by the threshold value calculator 40, are supplied to the correlation value calculator 34a, and are used for the judgment of presence of a correlation between each of the external peripheral pixels and the target pixel.

The predetermined value calculator 41 obtains Lm and LM by use of the signal values of the video signals of the external peripheral pixels. In addition, the predetermined value calculator 41 obtains Lm and LM by use of a value indicating a magnitude of variations of the video signals of the external peripheral pixels. The value var1 indicating the magnitude of the variations of the signal values of the video signals of the external peripheral pixels can be obtained by use of the average value $g_{av}4$ of the signal values of the video signals of the external peripheral pixels obtained in the above described manner.

To be more concrete, the predetermined value calculator 41 acquires the signal values of the video signals of the external peripheral pixels from the signal reading-out unit 32b, and obtains the average value $g_{av}4$ as described above. The predetermined value calculator 41 adds the differences between the obtained $g_{av}4$ and each of the signal values of the video signals of the external peripheral pixels, and divides the total sum obtained in such a manner by the number of the external peripheral pixels. Thus, var1 is obtained.

$$var1=(|g00-g_{av}4|+|g02-g_{av}4|+|g04-g_{av}4|+|g20-g_{av}4|+|g24-g_{av}4|+|g40-g_{av}4|+|g42-g_{av}4|+|g44-g_{av}4|)/8$$

where |x| represents an absolute value of x

The first predetermined value Lm is obtained by subtracting a product of the obtained var1 and a suitable adjusting value adj2 from the average value $g_{av}4$. In addition, the second predetermined value LM is obtained by adding a product of the obtained var1 and a suitable adjusting value adj2 to the average value $g_{av}4$ $$Lm=g_{av}4-var1*adj2$$

$$LM=g_{av}4+var1*adj2$$

Note that adj2 should be set to a value which is considered to be suitable after performing the noise reduction processing actually. adj2 is set to, for example, 2.

The predetermined values Lm and LM, which have been obtained by the predetermined value calculator 41, are supplied to the defect judgment unit 36, and are used for judging whether a defect has occurred in the target pixel G22.

(Effects)

According to this embodiment, the threshold values −mth1 and mth2 used for the judgment of presence of a correlation by the correlation value calculator 34a is obtained based on the signal values of the video signals of the external peripheral pixels. If the threshold values are set independently from the signal values of the video signals of the external peripheral pixels, it may be judged that there is correlation even when there no correlation actually in the case of an image outputting large signal values as a whole. On the other hand, in the case of an image outputting small signal values as a whole, it may be judged that there is no correlation even when there is actually correlation. Therefore, by obtaining the correlation value by use of the threshold values obtained by the average value of the signal values of the video signals of the external peripheral pixels, the correlation value calculator 34a can judge presence of a correlation between the video signal of each of the external peripheral pixels and the video signal of the target pixel more accurately. Accordingly, it is possible to perform the noise reduction processing more accurately.

Furthermore, the first predetermined value Lm and the second predetermined value LM, which are used by the defect judgment unit 36, are obtained based on the signal values of the video signals of the external peripheral pixels. When the first predetermined value Lm and the second predetermined value LM are set independently from the video signals of the external peripheral pixels, the judgment that a defect has occurred in the target pixel is apt to be made for images showing large signal values as a whole and showing small signal values as a whole. Therefore, the judgment for the defect is performed by use of the first and second predetermined values, which have been obtained by use of the average value of the signal values of the video signals of the external peripheral pixels, whereby the defect judgment unit 36 can judge more accurately whether the defect has occurred in the target pixel. Accordingly, it is possible to perform the noise reduction processing more accurately.

(Modifications)

The present invention is not limited to the above embodiments, and various modifications may be possible.

In the above described embodiments, though the average value calculators 37a to 37c obtain the weighted average value of the signal values of the video signals of the external peripheral pixels having correlations with the target pixel, the average value calculators 37a to 37c may obtain the weighted average value of the signal values of the video signals of both the target pixel and the external peripheral pixels having the correlation with the target pixel. Specifically, the weighted average values $g_{av}1$ through $g_{av}3$ obtained by the average value calculators 37a to 37c are determined in the following manner.

$$g_{av}1=(g00*mC00+g02*mC02+g04*mC04+g20*mC20+g24*mC24+g40*mC40+g42*mC42+g44*mC44+g22)/(\Sigma mC+1)$$

$$g_{av}2=(g00*sC00+g02*sC02+g04*sC04+g20*sC20+g24*sC24+g40*sC40+g42*sC42+g44*sC44+g22)/(\Sigma sC+1)$$

$$g_{av}3=(g00*mC00*sC00+g02*mC02*sC02+g04*mC04*sC04+g20*mC20*sC20+g24*mC24*sC24+g40*mC40*sC40+g42*mC42*sC42+g44*mC44*sC44+g22)/(\Sigma(mC*sC)+1)$$

Alternatively, in the first and second embodiments, the weighted average values $g_{av}1$, $g_{av}2$ and $g_{av}3$ are determined by considering the signal values of the video signals of the external peripheral pixels evenly, which are judged to have correlations with the target pixel. Specifically, all of the weights when the weighted average values are calculated are "1". However, the average value calculators 37a through 37c may calculate the weighted average values $g_{av}1$, $g_{av}2$ and $g_{av}3$ by changing the degree of the consideration for the respective external peripheral pixels. For example, the weighted average value calculators 37a through 37c may calculate the weighted average values by making the weights of the signal values of the video signals of the external peripheral pixels, which have large correlations with the target pixel, large and by making the weights of the signal values of the video signals of the external pixels, which have small correlations with the target pixel, small. For example, the main correlation values mCi used in calculating the weighted average values $g_{av}1$ nd $g_{av}3$ are set to "1" by the correlation value calculator 34a, when the first difference values mDi satisfy $-mth1 \leqq mDi \leqq mth2$. Similarly, the sub-correlation values sCi used in calculating the weighted average values $g_{av}2$ and $g_{av}3$ are set to "1" by the correlation value calculator 34b when the second difference values sDi satisfy $-sth1 \leqq sDi \leqq sth2$. However, the correlation value calculators 34a and 34b may set the main correlation values mCi or the sub-correlation values sCi to a value which is larger than "1", for example, "2", when the first difference values mDi or the second difference values sDi are closer to "0". In this case, the main correlation values mCi or the sub-correlation values sCi function as the weights. Thus, it is possible to perform the noise reduction processing more accurately.

Furthermore, as described above, when the average value calculators 37a through 37c use the signal value of the video signal of the target pixel in calculating the average values, the average value calculators 37a through 37c may calculate the weighted average values $g_{av}1$, $g_{av}2$ and $g_{av}3$ by making the weight for the signal value of the video signal of the target pixel large. For example, when weight for the external peripheral pixels having the correlations with the target pixel is set to "1" and when the weight for the target pixel is set to "2", the weighted average values $g_{av}1$, $g_{av}2$ and $g_{av}3$ are calculated in the following manner.

$$g_{av}1=(g00*mC00+g02*mC02+g04*mC04+g20*mC20+g24*mC24+g40*mC40+g42*mC42+g44*mC44+g22*2)/(\Sigma mC+2)$$

$$g_{av}1=(g00*sC00+g02*sC02+g04*sC04+g20*sC20+g24*sC24+g40*sC40+g42*sC42+g44*sC44+g22*2)/(\Sigma sC+2)$$

$$g_{av}3=(g00*mC00*sC00+g02*mC02*sC02+g04*mC04*sC04+g20*mC20*sC20+g24*mC24*sC24+g40*mC40*sC40+g42*mC42*sC42+g44*mC44*sC44+g22*2)/(\Sigma(mC*sC)+2)$$

Figure 9:
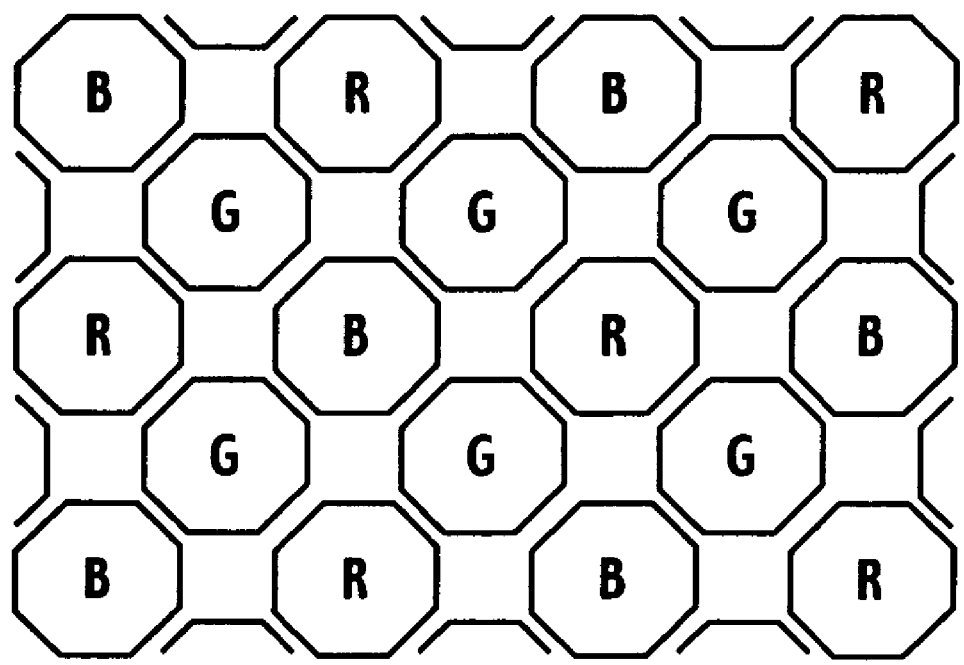
FIG. 9 is a diagram showing another arrangement of the filters arranged in the solid-state image pickup device provided in the image pickup apparatus of FIG. 1.

Furthermore, in this embodiment, though the arrangement of the pixels in the solid-state image pickup device is a tetragonal arrangement as shown in FIG. 2, the arrangement thereof may be a honeycomb arrangement as shown in FIG. 9, which is obtained by slanting the tetragonal arrangement by 45 degrees. Also in the case of the arrangement as shown in FIG. 9, the pixels arranged at the positions one pixel away from the target pixel in the horizontal and vertical directions as well as in the two diagonal directions are external peripheral pixels, and the pixels arranged at the positions adjacent to the target pixel in the horizontal and vertical directions as well as the two diagonal directions are internal peripheral pixels, whereby a noise reduction processing similar to that described above can be performed.

Furthermore, though the threshold value calculator 40 and the predetermined value calculator 41 in the second embodiment are configured to determine the average value of the signal values of the video signals of the external peripheral pixels, they may be configured to determine an average value of the signal values of the video signals of the external peripheral pixels and of the target pixel. Specifically, $g_{av}4$ is determined in the following manner.

$$g_{av}4=(g00+g02+g04+g20+g24+g40+g42+g44+g22)/9$$

In this case, a value var1 indicating a magnitude of variations is determined in the following manner.

$$var1=(|g00-g_{av}4|+|g02-g_{av}4|+|g04-g_{av}4|+|g20-g_{av}4|+|g24-g_{av}4|+|g40-g_{av}4|+|g42-g_{av}4|+|g44-g_{av}4|+|g22-g_{av}4|)/9$$

Furthermore, the predetermined value calculator 41 may use a standard deviation var2 of the signal values of the video signals of the external peripheral pixels as a value indicating a magnitude of the variations. var2 is determined in the following manner.

$$var2=\{(|g00-g_{av}4|^2+|g02-g_{av}4|^2+|g04-g_{av}4|^2+|g20-g_{av}4|^2+|g24-g_{av}4|^2+|g40-g_{av}4|^2+|g42-g_{av}4|^2+|g44-g_{av}4|^2)/8\}^{(1/2)}$$

Each of Lm and LM are determined by adding a product of the determined var2 and a suitable adjusting value adj2 in a similar manner to that of the second embodiment.

$$Lm=g_{av}4-var2*adj2$$

$$LM=g_{av}4+var2*adj2$$

Note that when the adjusting value adj2 is set to "2" as in the case of the second embodiment, it has been known that about 95% of the signal values of the video signals varied due to measurement errors taking values between the predetermined values Lm and LM. Accordingly, when the signal value of the video signal of the target pixel G22 varies due to a measurement error, a possibility that it is judged that there is a defect is reduced, and a more suitable noise reduction processing is enabled.

Alternatively, in the first and second embodiments, the noise reduction processing is performed by use of all of the external peripheral pixels arranged at the positions which are one pixel away from the target pixel. However, the noise reduction circuit 3 may perform the noise reduction processing by use of the external peripheral pixels which have been judged to be free from a defect. In this case, the signal reading-out unit 32*b* shown in FIG. 3 and in FIG. 8 functions also as an external defect judgment unit for judging whether the defect has occurred in the external peripheral pixels. On this occasion, the signal reading-out unit 32*b* judges that the defect has not occurred when the signal value of the video signal of the external peripheral pixel which it has read out is in range from the third predetermined value and the fourth predetermined value, as in the case of the defect judgment unit 36. In addition, the signal reading-out unit 32*b* outputs the signal values of the video signals of the external peripheral pixels which have been judged to be free from the defect. Accordingly, the signal values of the video signals of the external peripheral pixels are supplied to the difference calculator 33*a*, the average value calculators 37*a* through 37*c*, the threshold value calculator 40 and the predetermined value calculator 41, and are used for processing to reduce the noises of the target pixel. Note that the third predetermined value may be a value equal to the first predetermined value, that is, Lm, and the fourth predetermined value may be a value equal to the second predetermined value, that is, LM. In addition, the noise reduction circuit 3 may include an external defect judgment unit in addition to the signal reading-out unit 32*b*.

According to the above described constitution, when a signal value output as the signal value of the video signal of the target pixel is calculated, the signal values of the video signals of any pixels in which a defect has occurred are not used. Accordingly, it is possible to perform the noise reduction processing more accurately.

Furthermore, in the first embodiment and the second embodiment, though the internal peripheral pixels are used, it is acceptable that the relation between each of the external peripheral pixels and the target pixel is used and the relations between the internal peripheral pixels are not used. According to such a constitution, it is possible to realize the noise reduction device while suppressing cost more easily.

Furthermore, in the first embodiment and the second embodiment, the noise reduction device and the noise reduction method are realized by use of the noise reduction circuit. However, the noise reduction device and the noise reduction method can be realized by installing a program, which has the same function as the noise reduction circuit, onto a computer having a CPU and memory.

What is claimed is:

1. A noise reduction device reducing a noise superimposed on a video signal including plural kinds of color signals, each of which is output by a pixel, comprising:

a first signal reading-out unit configured to read out a video signal of a target pixel for which a noise reduction is performed;

a second signal reading-out unit configured to read out video signals of external peripheral pixels arranged around internal peripheral pixels in radial directions from the target pixel, the internal peripheral pixels being arranged adjacent to the target pixel, the external peripheral pixels outputting the same color signals as the video signal of the target pixel;

a third signal reading-out unit configured to read out video signals of the internal peripheral pixels;

a selection controller configured to judge presence of a correlation between the video signal of the target pixel and respective video signals of the external peripheral pixels, based on a relation between a signal value of the video signal of the target pixel and respective signal values of the video signals of the external peripheral pixels, and based on a relation between respective signal values of the video signals of the internal peripheral pixels;

a signal calculator configured to calculate a signal value of a video signal of the target pixel by use of the signal values of the video signals of the external peripheral pixels; and a selector configured to select the signal value of the video signal of the target pixel calculated by the signal calculator, when the selection controller judges that number of video signals of the external peripheral pixels having correlations with the video signal of the target pixel is large, wherein, when the selection controller judges that the number of the video signals of the external peripheral pixels having correlations with the video signal of the target pixel is small, the selector selects the signal value of the video signal of the target pixel read out by the first signal reading-out unit.

2. The noise reduction device according to claim 1, wherein the number of the external peripheral pixels are provided by n, n being the natural number;

the n external peripheral pixels are first through n-th external peripheral pixels;

the n internal peripheral pixels are first through n-th internal peripheral pixels, and a direction of the k-th external peripheral pixel with respect to the target pixel and a direction of the k-th internal peripheral pixel with respect to the target pixel are the same, k being a natural number satisfying 1<k<n;

the device further comprising:

a first correlation value calculator configured to determine first to n-th main correlation values respectively indicating presence of correlations between the respective video signals of the first through n-th external peripheral pixels and the video signal of the target pixel, based on results obtained by subtracting the signal value of the video signal of the target pixel, which has been read out by the first signal reading-out unit, from the respective signal values of the video signals of the first through n-th external peripheral pixels, which have been read out by the second signal reading-out unit; and a second correlation value calculator configured to determine first through n-th sub-correlation values respectively indicating presence of correlations between the respective video signals of the first through n-th external peripheral pixels and the video signal of the target pixel, based on results obtained by subtracting the signal values of the video signals of the internal peripheral pixels existing at a position symmetrical to the respective first through n-th internal peripheral pixels around the target pixel, from the signal values of the video signals of the respective first through n-th internal peripheral pixels, which have been read out by the second signal reading-out unit, wherein the selection controller judges presence of a correlation between the video signal of respective-first through n-th external peripheral pixels and the video signal of the target pixel based on the first to n-th main correlation values and the first through n-th sub-correlation values.

3. The noise reduction device according to claim 2, wherein the first through n-th main correlation values and the first through n-th sub-correlation values are respectively binarized values;

the first correlation value calculator sets the value of the k-th main correlation value to be a value indicative of presence of a correlation with the video signal of the target pixel, when a value obtained by subtracting the signal value of the video signal of the target pixel from the signal value of the video signal of the k-th external peripheral pixel is in a range from a first threshold value to a second threshold value;

the second correlation value calculator sets the value of the k-th sub-correlation value to be a value indicative of presence of a correlation with the video signal of the target pixel, when a value obtained by subtracting the signal value of the video signal of the internal peripheral pixel existing at a position symmetrical to the k-th internal peripheral pixel around the target pixel from the signal value of the video signal of the k-th internal peripheral pixel is in a range from a third threshold value to a fourth threshold value.

4. The noise reduction device according to claim 3, further comprising:

a threshold value calculator configured to determine the first and second threshold values by use of the signal values of the video signals of the external peripheral pixels.

5. The noise reduction device according to claim 4, wherein the threshold value calculator determines the first and second threshold values by use of an average value of the signal values of the video signals of the external peripheral pixels.

6. The noise reduction device according to claim 2, wherein the main correlation value indicating presence of a correlation with the video signal of the target pixel is defined as a correlated main correlation value, and the sub-correlation value indicating presence of a correlation with the video signal of the target pixel is defined as a correlated sub-correlation value, the selection controller compares the total number of the correlated main correlation values with a first predetermined number, the selection controller judges the number of the video signals of the external peripheral pixels having correlations with the video signal of the target pixel to be small when the total number of the correlated main correlation values is smaller than the first predetermined number, and the selection controller judges the number of the video signals of the external peripheral pixels having correlations with the video signal of the target pixel to be large when the total number of the correlated main correlation value is the first predetermined value or more.

7. The noise reduction device according to claim 6, wherein the selection controller compares the total number of the correlated main correlation values with a second predetermined number larger than the first predetermined number when the total number of the correlated main correlation values is the first predetermined number or more, when the selection controller judges that the total number of the correlated main correlation values is in a range from the first predetermined number to the second predetermined number inclusive, the selector selects a weighted average value of the video signals of the external peripheral pixels corresponding to the correlated main correlation values calculated by the signal calculator; and when the selection controller judges that the total number of the correlated main correlated values is larger than the second predetermined number, the selector selects a weighted average value of the video signals of the external peripheral pixels corresponding to both of the correlated main correlation values and the correlated sub-correlated values calculated by the signal calculator.

8. The noise reduction device according to claim 1, wherein when the selection controller judges that the number of the external peripheral pixels having correlations with the video signal of the target pixel is small, the selection controller compares the signal value of the video signal of the target pixel-read out by the first signal reading-out unit, with a first predetermined value and a second predetermined value, when the selection controller judges that the signal value of the video signal of the target pixel is in either of a range smaller than the first predetermined value and a range larger than the second predetermined value, the selector selects a weighted average value of the video signals of the external peripheral pixels corresponding to the correlated sub-correlation value calculated by the signal calculator, and when the selection controller judges that the signal value of the video signal of the target pixel is in a range from a first predetermined value to a second predetermined value inclusive, the selector selects the signal value of the video signal of the target pixel which has been read out by the first signal reading-out unit.

9. The noise reduction device according to claim 8, further comprising a predetermined value calculator configured to determine the first and second predetermined values by use of the signal values of the video signals of the external peripheral pixels.

10. The noise reduction device according to claim 9, wherein the predetermined value calculator determines the first and second predetermined values by use of a value indicating a magnitude of variations of the signal values of the video signals of the external peripheral pixels.

11. A noise reduction device reducing a noise superimposed on a video signal including plural kinds of color signals, each of which is output by a pixel, comprising:

a selection controller configured to judge presence of a correlation between a video signal of a target pixel and respective video signals of external peripheral pixels, based on a relation between a signal value of the video signal of the target pixel and respective signal values of the video signal of the external peripheral pixels, and based on relations between respective signal values of video signals of internal peripheral pixels and the video signal of the target pixel for which a noise reduction is performed, the internal peripheral pixels being arranged adjacent to the target pixel, the external peripheral pixels being arranged around the internal peripheral pixels and outputting the same color signals as the target pixel; and a selector configured to select a signal value output as the signal value of the video signal of the target pixel from a signal value calculated by use of the signal values of the video signals of the external peripheral pixels and the signal value of the video signal of the target pixel, in accordance with results judged by the selection controller, wherein, when the selection controller judges that number of video signals of the external peripheral pixels having correlations with video signal of the target pixel is small, the selector selects signal value of the video signal of the target pixel for which a noise reduction is performed.

12. The noise reduction device according to any one of claims 1 and 11, further comprising an external defect judgment unit configured to judge whether a defect has occurred in each of the external peripheral pixels, and wherein the external peripheral pixels used for reducing the noises of the target pixel are external peripheral pixels judged by the external defect judgment unit to be those where the defect has not occurred.

13. The noise reduction device according to claim 12, wherein the external defect judgment unit judges that the defect has not occurred when the signal value of the video signal of each of the external peripheral pixels is in a range from a third predetermined value to a fourth predetermined value inclusive.

14. A noise reduction method which reduces a noise superimposed on a video signal including plural kinds of color signals, each of which is output by a pixel, comprising steps of:

reading out, with a first reader, a video signal of a target pixel for which a noise reduction is performed;

reading out, with a second reader, video signals of external peripheral pixels arranged around internal peripheral pixels arranged adjacent to the target pixel in radial directions from the target pixel, the external peripheral pixels outputting the same color signals as the video signal of the target pixel;

reading out, with a third reader, video signals of the internal peripheral pixels;

judging, with a judger, presence of a correlation between the video signal of the target pixel and respective video signals of the external peripheral pixels based on a relation between a signal value of the video signal of the target pixel and respective signal values of the video signals of the external peripheral pixels, and based on a relation between respective signal values of the video signals of the internal peripheral pixels;

calculating, with a calculator, the signal value of the video signal of the target pixel by use of the signal values of the video signals of the external peripheral pixels; and selecting, with a selector, the signal value of the video signal of the target pixel calculated by use of the signal values of the video signals of the external peripheral pixels when the number of the video signals of the external peripheral pixels having correlations with the video signal of the target pixel is large, wherein, when number of the video signals of the external peripheral pixels having correlations with the video signal of the target pixel is small, the selector selects signal value of the video signal of the target pixel for which a noise reduction is performed.

15. A noise reduction method which reduces a noise superimposed on a video signal including plural kinds of color signals, each of which is output by a pixel, comprising steps of:

judging, with a judger, presence of a correlation between a video signal of a target pixel and respective video signals of external peripheral pixels based on a relation between a signal value of the video signal of the target pixel and respective signal values of the video signal of the external peripheral pixels, and based on relations between respective signal values of video signals of internal peripheral pixels and the video signal of the target pixel for which a noise reduction is performed, the external peripheral pixels being arranged around the internal peripheral pixels and outputting the same color signals as the target pixel; and selecting, with a selector, a signal value output as the signal value of the video signal of the target pixel from a signal value calculated by use of the signal values of the video signals of the external peripheral pixels and the signal value of the video signal of the target pixel, in accordance with judged results, wherein, when number of the video signals of the external peripheral pixels having correlations with the video signal of the target pixel is small, the selector selects signal value of the video signal of a target pixel for which a noise reduction is performed.

16. An image pickup apparatus, comprising:

a solid state image pickup device having plural kinds of color filters provided on surfaces of pixels and outputting video signals which become plural kinds of color signals; and the noise reduction device defined in any one of claims 1 and 11, to which the video signals from the solid state image pickup device are input.

* * * * *